June 11, 1940.  I. H. DRIGGS  2,204,404
AIRCRAFT CONSTRUCTION
Filed June 13, 1939    2 Sheets-Sheet 1
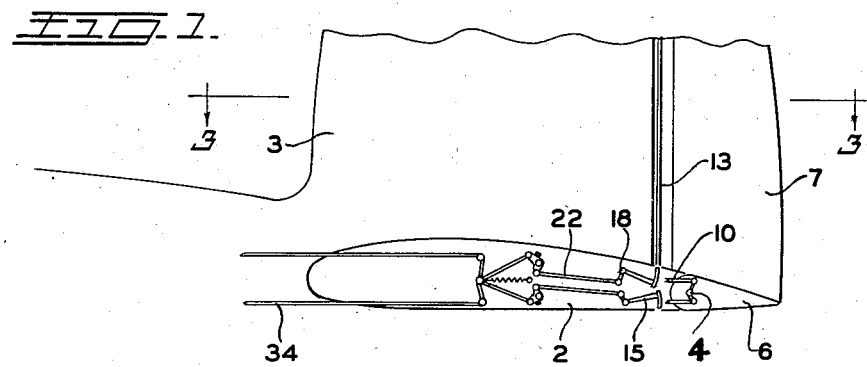
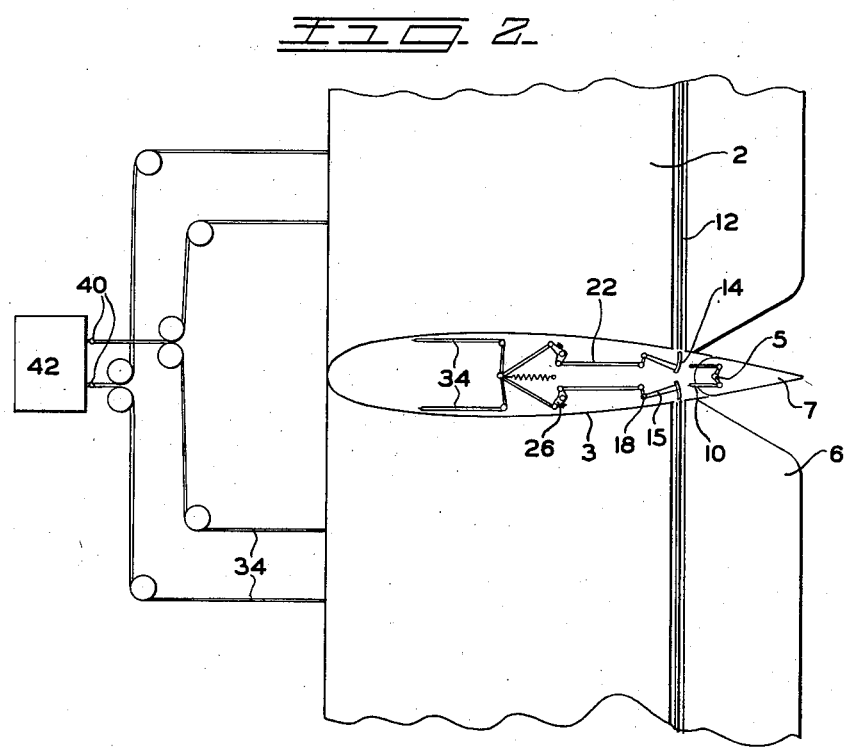
Inventor
IVAN H. DRIGGS
By
Attorney June 11, 1940.  I. H. DRIGGS  2,204,404
AIRCRAFT CONSTRUCTION
Filed June 13, 1939  2 Sheets-Sheet 2
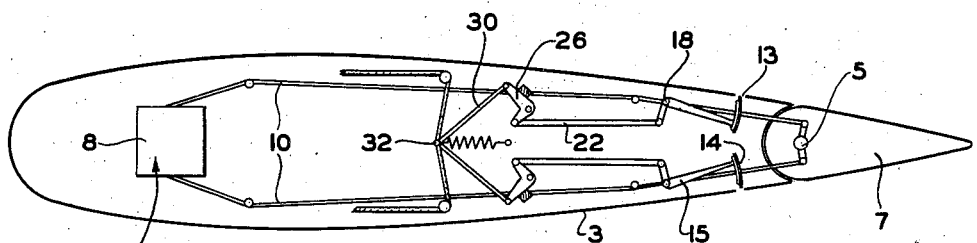
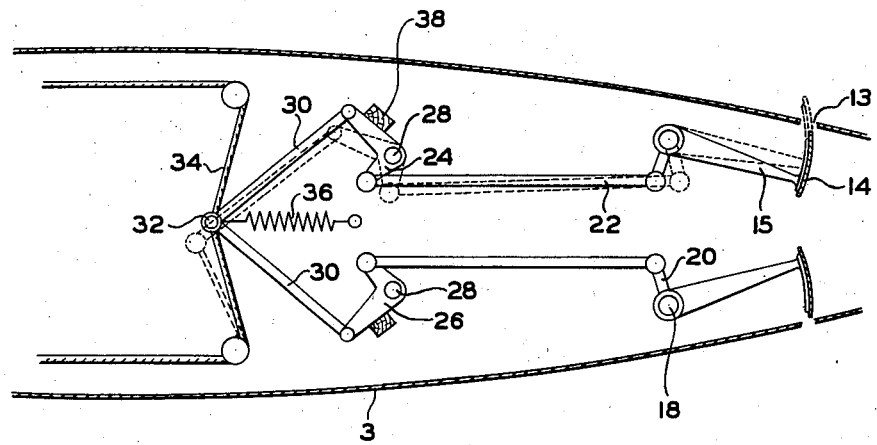
Inventor
IVAN H. DRIGGS
By
Attorney Patented June 11, 1940

2,204,404

UNITED STATES PATENT OFFICE 2,204,404

AIRCRAFT CONSTRUCTION

Ivan H. Driggs, Towson, Md., assignor to The Glenn L. Martin Company, Baltimore, Md.

Application June 13, 1939, Serial No. 278,832

2 Claims. (Cl. 244—87)

The invention relates to a control system for aircraft, and particularly to a system for aircraft having a movable empennage surface operated by an irreversible control mechanism and which is used for trimming the aircraft.

The primary object of the invention is to provide an arrangement in which a fixed stabilizing or empennage surface is provided with a single movable control surface hinged thereto which is used only for trimming, and in which the control is accomplished by means which change the velocity of airflow around the fixed surface.

A further object of the invention is to provide a mechanism of this type in which the control means is normally mounted within the streamline surface of the fixed empennage or stabilizing surface, and is projected therefrom for control purposes.

One great advantage of the invention is that this construction reduces the force required to control the aircraft, which is particularly important in the large airplanes which are being built at the present time.

A further advantage is that the danger of fluttering of the trimming surface is avoided since the control thereto can be made irreversible.

Another object is to improve the efficiency of the trimming surface by causing it to have only the single function of trimming, while at the same time permitting adequate control of the aircraft.

Further objects and advantages of the invention will appear more fully from the following description, particularly when taken in conjunction with the accompanying drawings which form a part thereof.

In the drawings:

Fig. 1 shows in vertical section an airplane empennage embodying the invention;

Fig. 2 is a top plan view thereof;

Fig. 3 is an enlarged cross section on the line 3—3 of Fig. 1; and

Fig. 4 is a detail view of the operating mechanism for the spoilers.

As shown in the drawings, the invention is applied to air foils 2 and 3 which are fixed empennage stabilizing surfaces, forming parts of the elevator and of the rudder respectively. Hinged at 4 and 5 on the rear ends of the stabilizing surfaces 2 and 3 are control members 6 and 7. These control members are operated from conventional irreversible control mechanisms such as 8 through cables 10. The control members 6 and 7 are used only for the purpose of trimming the aircraft, and not for controlling the same.

The surfaces of the stabilizing surfaces 2 and 3 are each cut away at two points, such as 12, 13, to provide spaces for spoilers 14 mounted on arms 15 which are pivoted at their forward ends at 18. In the position shown in Fig. 3, these spoilers are in retracted position within the streamline surface of the fixed stabilizing member 3. Rigid with spoiler arms 15 are arms 20 connected by links 22 to bellcrank levers having arms 24 connected to the links 22 and other arms 26, and pivoted at 28. Arms 26 are connected by pivoted links 30 to a common point 32 of a control cable 34. A coil spring 36 connected to the point 34 and to a fixed portion of the stabilizer tends to draw the point 32 backwardly.

When it is desired to control the aircraft, one of the other of the spoilers is moved. Obviously when this is done, the spoiler will protrude from the streamline surface and will change the velocity of air flow over one of the faces thereof. This will give to the surface a displacing action in one direction or the other, and thus will control the flight of the aircraft.

Fig. 4 shows in broken lines one of the spoilers in projected position. As will be noted, the arms 26 of the bellcrank levers engage against stops 38 which limit their movement in a direction to draw the spoilers 14 inwardly. When the cable 34 is pulled, for example as shown in Fig. 4, so as to move the point 32 downwardly, the lower bellcrank lever is unable to move, and point 32 will therefore move about the pivot of lower link 30 as an axis. On the other hand, the upper bellcrank lever will move to the broken line position shown in Fig. 4, thus projecting the upper spoiler 14 from the streamline surface. The spring 36 tends to return the parts always to the normal position shown in solid lines in Fig. 4.

As shown in Fig. 2, cables 34 for the spoilers on opposite sides of the elevator surface are connected as at 40 and are operated by a common control mechanism 42, so that the elevator spoilers operate simultaneously in the same direction, either up or down.

Obviously the shape and operation of the spoilers may be greatly modified, the only requirement being that some mechanism shall be provided capable of projecting them from one side or the other of the stabilizing surface, with control mechanism for causing selective movement to one side or the other.

While I have described herein one embodiment of my invention I wish it to be understood that I do not intend to limit myself thereby except within the scope of the appended claims.

I claim:

1. In an aircraft tail construction, a fixed stabilizing surface, a trim surface hinged at the trailing edge of the stabilizing surface, means carried by said stabilizing surface adjacent said trim surface for changing the velocity of airflow over said stabilizing surface, said last means comprising two spoilers hinged within said stabilizing surface for movement to positions projecting therefrom on opposite sides thereof, opposed bell crank levers, links each pivoted to one arm of one of said bell crank levers and to one of said spoilers, stops to limit the turning movement of the second arms of said levers away from each other, links pivoted to the second arms of said levers converging towards a common point, a flexible control, and means connecting said links to said flexible control.

2. In aircraft construction, two members hingedly mounted for selective movement, oppositely arranged bellcrank levers mounted to turn about spaced parallel pivots, links each pivoted to one arm of one of said bellcrank levers and to one of said members, stops interposed in the paths of the second arms of the bellcrank levers to limit the turning movement of the second arms of said levers away from each other, links pivoted to the second arms of said levers converging towards a common point, a flexible control movable in a direction substantially parallel to a line joining the pivots of said levers, and means connecting said last links to said flexible control.

IVAN H. DRIGGS.